United States Patent
Gaffin-Cahn (10) Patent No.: US 12,097,878 B2
(45) Date of Patent: Sep. 24, 2024

(54) GENERATING TRAINING DATA FOR MACHINE LEARNING BASED MODELS FOR AUTONOMOUS VEHICLES

(71) Applicant: Perceptive Automata, Inc., Boston, MA (US)

(72) Inventor: Elon Gaffin-Cahn, Boston, MA (US)

(73) Assignee: Perceptive Automata, Inc., Boston, MA (US)

( * ) Notice: Subject to any disclaimer, the term of this patent is extended or adjusted under 35 U.S.C. 154(b) by 239 days.

(21) Appl. No.: 17/730,048

(22) Filed: Apr. 26, 2022

(65) Prior Publication Data

US 2023/0339504 A1 Oct. 26, 2023

(51) Int. Cl.
*B60W 60/00* (2020.01)
*B60W 40/04* (2006.01)

(52) U.S. Cl.
CPC ........ *B60W 60/0011* (2020.02); *B60W 40/04* (2013.01); *B60W 2554/402* (2020.02); *B60W 2554/4041* (2020.02); *B60W 2556/10* (2020.02)

(58) Field of Classification Search
CPC ............. B60W 60/0011; B60W 40/04; B60W 2554/402; B60W 2554/4041; B60W 2556/10; B60W 60/001; G06N 3/09
See application file for complete search history.

(56) References Cited

U.S. PATENT DOCUMENTS

| 10,402,687 B2 | 9/2019 | Anthony et al. | |
| 10,783,559 B1* | 9/2020 | Tran | G06Q 30/0266 |
| 11,520,346 B2 | 12/2022 | Anthony | |
| 2014/0006129 A1* | 1/2014 | Heath | G06Q 30/02 705/14.23 |
| 2016/0054135 A1* | 2/2016 | Fowe | G01C 21/34 701/411 |
| 2019/0234751 A1 | 8/2019 | Takhirov | |
| 2020/0241545 A1 | 7/2020 | Anthony | |
| 2020/0247432 A1 | 8/2020 | Misra et al. | |
| 2020/0249674 A1 | 8/2020 | Dally et al. | |
| 2020/0284883 A1* | 9/2020 | Ferreira | G01S 7/4811 |
| 2024/0056933 A1* | 2/2024 | Lin | H04W 36/0083 |

FOREIGN PATENT DOCUMENTS

| WO | WO 2018/217526 A1 | 11/2018 |
| WO | WO 2020/160276 A1 | 8/2020 |

OTHER PUBLICATIONS

International Search Report and Written Opinion, Patent Cooperation Treaty Application No. PCT/US2023/018818, mailing date Jul. 21, 2023, 12 pages.

* cited by examiner

*Primary Examiner* — Yonel Beaulieu
(74) *Attorney, Agent, or Firm* — Fenwick & West LLP (57) ABSTRACT

A system receives information describing paths traversed by vehicles of a vehicle type, for example, a bicycle or a motorcycle. The system determines locations along the paths. For each location the system determines a measure of likelihood of encountering vehicles of the vehicle type in traffic at the location. The system selects a subset of locations based on the measure of likelihood and obtains sensor data captured at the subset of locations. The system uses the sensor data as training dataset for training a machine learning based model configured to receive input sensor data describing traffic and output a score used for navigation of autonomous vehicles. The machine learning model is provided to a vehicle, for example, an autonomous vehicle for navigation of the autonomous vehicle.

20 Claims, 7 Drawing Sheets

GENERATING TRAINING DATA FOR MACHINE LEARNING BASED MODELS FOR AUTONOMOUS VEHICLES

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The present disclosure relates generally to machine learning models for autonomous vehicles and more specifically to generating training data for machine learning models used for navigation of autonomous vehicles.

BACKGROUND

Machine learning based models may be used for various applications related to autonomous vehicles, for example, for navigation of autonomous vehicles. A machine learning based model may receive sensor data captured by sensors mounted on an autonomous vehicle and make predictions that are used by the autonomous vehicles while driving. These machine learning based models may be trained using training data, for example, sensor data that is captured by vehicles while driving through traffic. The effectiveness of machine learning based models depends on the quality of the training data used for training the model. For example, while driving through traffic, similar traffic scenarios are encountered very often. For example, while driving on the highway, the sensor data captured for several hours may be very similar, thereby reflecting very similar traffic scenarios. Large amount of sensor data may be captured using vehicles. However, it may be difficult to identify specific traffic scenarios in the sensor data. For example, certain types of vehicles such as bicycles or motorcycles may be encountered less frequently compared to cars. If a machine learning model is not trained using these less common traffic scenarios, the machine learning based model may perform poorly when the autonomous vehicle encounters these traffic scenarios while driving.

SUMMARY

The system receives information describing a plurality of trips taken by vehicles of a vehicle type, for example, a bicycle or a motorcycle. Each trip is identified by an origin and a destination. For each trip, the system accesses a map service to determine a path from the origin of the trip to the destination of the trip.

The system determines a plurality of locations, each location on a path. For each location the system determines a measure of likelihood of encountering vehicles of the vehicle type in traffic at the location. The system selects a subset of locations from the plurality of locations based on the measure of likelihood of encountering vehicles of the vehicle type in traffic at the location. The system obtains sensor data captured at each location from the subset of locations. The sensor data represents traffic at the location.

The system uses the sensor data as a training dataset for training a machine learning based model configured to receive input sensor data describing traffic and output a score used for navigation of autonomous vehicles. The machine learning model is provided to a vehicle, for example, an autonomous vehicle for navigation of the autonomous vehicle.

In an embodiment, the machine learning based model is used for navigation of the autonomous vehicle as follows. A system, for example, a vehicle's computing system of an autonomous vehicle receives sensor data captured by sensors of the autonomous vehicle. The vehicle's computing system provides the sensor data as input to the machine learning based model. The machine learning based model outputs one or more values associated with attributes of a traffic entity represented in the sensor data. The vehicle's computing system determines a navigation action corresponding to one or more values. The vehicle's computing system provides signals to controls of the autonomous vehicle to perform the determined navigation action.

In an embodiment, the measure of likelihood of encountering a vehicle of the vehicle type (e.g., a bicyclist) in traffic at the location is determined based on the number of paths from the plurality of paths that include the location.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Embodiments of the invention concern training datasets for training machine learning models (ML models) used by autonomous vehicles. For example, the machine learning based models may receive sensor data describing a traffic scenario and predict behavior of traffic entities in the traffic. The traffic entities represent non-stationary objects in the traffic in which the autonomous vehicle is driving, for example, a pedestrian, a bicycle, a vehicle, a delivery robot, and so on. In an embodiment, the machine learning based models predict, a state of mind of a user represented by a traffic entity such as a pedestrian or a bicyclist. The state of mind may concern a task that a user represented by the traffic entity is planning on accomplishing, for example, crossing the street or stepping on to the street to pick up some object.

The system extracts sensor data, for example, videos/video frames representing different traffic scenarios from videos for training and validating ML models. The sensor data representing various traffic scenarios are used for ML model validation or training.

Effective training of the ML model requires training data that includes various scenarios. However, certain traffic scenarios are rare compared to other traffic scenarios. For example, traffic that includes one or more bicyclists is encountered less frequently compared to traffic that includes only cars. The system, according to various embodiments, helps obtain training data representing traffic scenarios that include vehicles of specific vehicle types, such as bicycles or motorcycles. The system identifies locations that are more likely to encounter vehicles of specific vehicle types. Accordingly, sensor data captured at these locations is more likely to include vehicles of a specific vehicle type, thereby providing the required training data.

According to an embodiment, an autonomous vehicle identifies traffic entities, for example, based on the sensor data. For each traffic entity, motion parameters describing movement of the traffic entity are determined. The machine learning based model is used to predict additional information describing a traffic entity, for example, a state of mind of a user represented by the traffic entity. The machine learning based model is trained. The autonomous vehicle is navigated based on the motion parameters and the predicted attributes of each of the traffic entities.

According to an embodiment, an autonomous vehicle receives sensor data from sensors mounted on the autonomous vehicle. Traffic entities from the traffic are identified based on the sensor data. For each traffic entity, a hidden context is determined based on a machine learning based model. The machine learning based model is trained based on feedback received from users presented with images or videos showing traffic scenarios. The output of the machine learning based model comprises a measure of statistical distribution of the hidden context.

In one embodiment, the machine learning based model is trained as follows. The system generates stimuli comprising a plurality of video frames representing traffic entities. The stimulus comprises sample images of traffic entities near streets and/or vehicles and indicate or are measured for their understanding of how they believe the people will behave. The stimulus is modified to indicate a turn direction that a vehicle is planning on turning into. For example, the images of the stimuli may include arrows representing the turn direction. Alternatively, the stimuli may be annotated with text information describing the turn direction. The system presents the stimuli to a group of users (or human observers). These indicators or measurements are then used as a component for training a machine learning based model that predicts how people will behave in a real-world context. The machine learning based model is trained based on the reactions of human observers to sample images in a training environment. The trained machine learning based model predicts behavior of traffic entities in a real-world environment, for example, actual pedestrian or bicyclist behavior in traffic as a vehicle navigates through the traffic.

In an embodiment, the autonomous vehicle is navigated by generating signals for controlling the autonomous vehicle based on the motion parameters and the hidden context of each of the traffic entities. The generated signals are sent to controls of the autonomous vehicle. The sensor data may represent images or videos captured by cameras mounted on the autonomous vehicle or lidar scans captured by a lidar mounted on the autonomous vehicle.

Systems for predicting human interactions with vehicles are disclosed in U.S. patent application Ser. No. 15/830,549, filed on Dec. 4, 2017 which is incorporated herein by reference in its entirety. Systems for controlling autonomous vehicles based on machine learning based models are described in U.S. patent application Ser. No. 16/777,386, filed on Jan. 30, 2020, U.S. patent application Ser. No. 16/777,673, filed on Jan. 30, 2020, and U.S. patent application Ser. No. 16/709,788, filed on Jan. 30, 2020, and PCT Patent Application Number PCT/US2020/015889 filed on Jan. 30, 2020, each of which is incorporated herein by reference in its entirety.

System Environment

Figure 1:
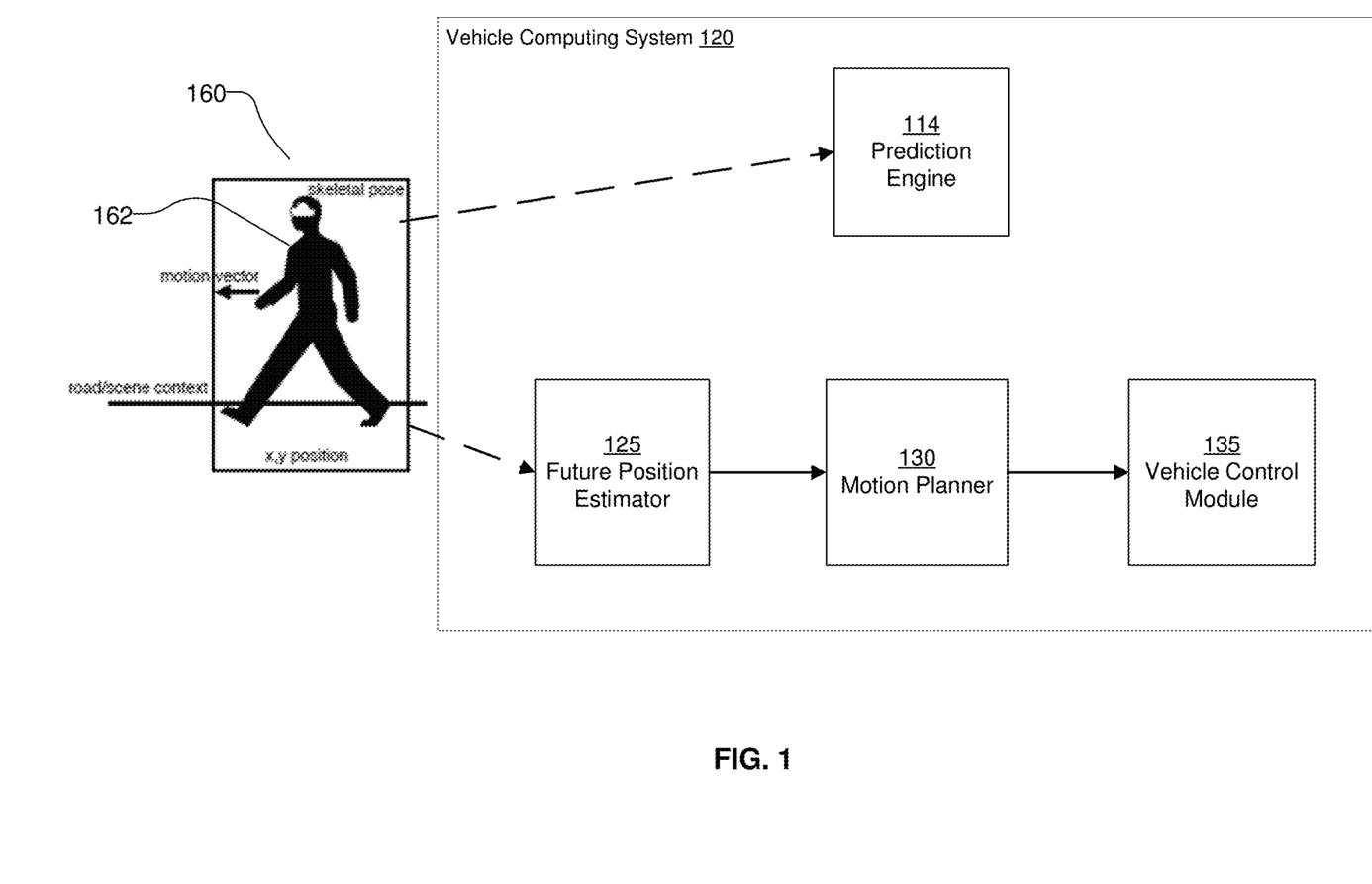
FIG. 1 is the system architecture of a vehicle computing system that navigates an autonomous vehicle based on prediction of hidden context associated with traffic objects according to an embodiment of the invention.

FIG. 1 is the system architecture of a vehicle computing system that navigates an autonomous vehicle based on prediction of hidden context associated with traffic objects according to an embodiment of the invention. The vehicle computing system 120 comprises the prediction engine 114, a future position estimator 125, a motion planner 130, a vehicle control module 135, a world model modulation module 145, and a false positive reduction module 155. Other embodiments may include more or fewer modules than those shown in FIG. 1B. Actions performed by a particular module as indicated herein may be performed by other modules than those indicated herein.

The sensors of an autonomous vehicle capture sensor data 160 representing a scene describing the traffic surrounding the autonomous vehicle. Examples of sensors used by an autonomous vehicle include cameras, lidars, GNSS (global navigation satellite system such as a global positioning system, or GPS), IMU (inertial measurement unit), and so on. Examples of sensor data include camera images and lidar scans.

The traffic includes one or more traffic entities, for example, a pedestrian 162. The vehicle computing system 120 analyzes the sensor data 160 and identifies various traffic entities in the scene, for example, pedestrians, bicyclists, other vehicles, and so on. The vehicle computing system 120 determines various parameters associated with the traffic entity, for example, the location (represented as x and y coordinates), a motion vector describing the movement of the traffic entity, and so on. For example, a vehicle computing system 120 may collect data of a person's current and past movements, determine a motion vector of the person at a current time based on these movements, and extrapolate a future motion vector representing the person's predicted motion at a future time based on the current motion vector.

The future position estimator 125 estimates the future position of a traffic entity. The motion planner 130 determines a plan for the motion of the autonomous vehicle. The vehicle control module 135 sends signals to the vehicle controls (for example, accelerator, brakes, steering, emergency braking system, and so on) to control the movement of the autonomous vehicle. In an embodiment, the future position estimates for a traffic entity determined by the future position estimator 125 based on sensor data 160 are provided as input to the motion planner 130. The motion planner 130 determines a plan for navigating the autonomous vehicle through traffic, and provides a description of the plan to the vehicle control module 135. The vehicle control module 135 generates signals for providing to the vehicle controls. For example, the vehicle control module 135 may send control signals to an emergency braking system to stop the vehicle suddenly while driving, the vehicle control module 135 may send control signals to the accelerator to increase or decrease the speed of the vehicle, or the vehicle control module 135 may send control signals to the steering of the autonomous vehicle to change the direction in which the autonomous vehicle is moving.

Figure 2:
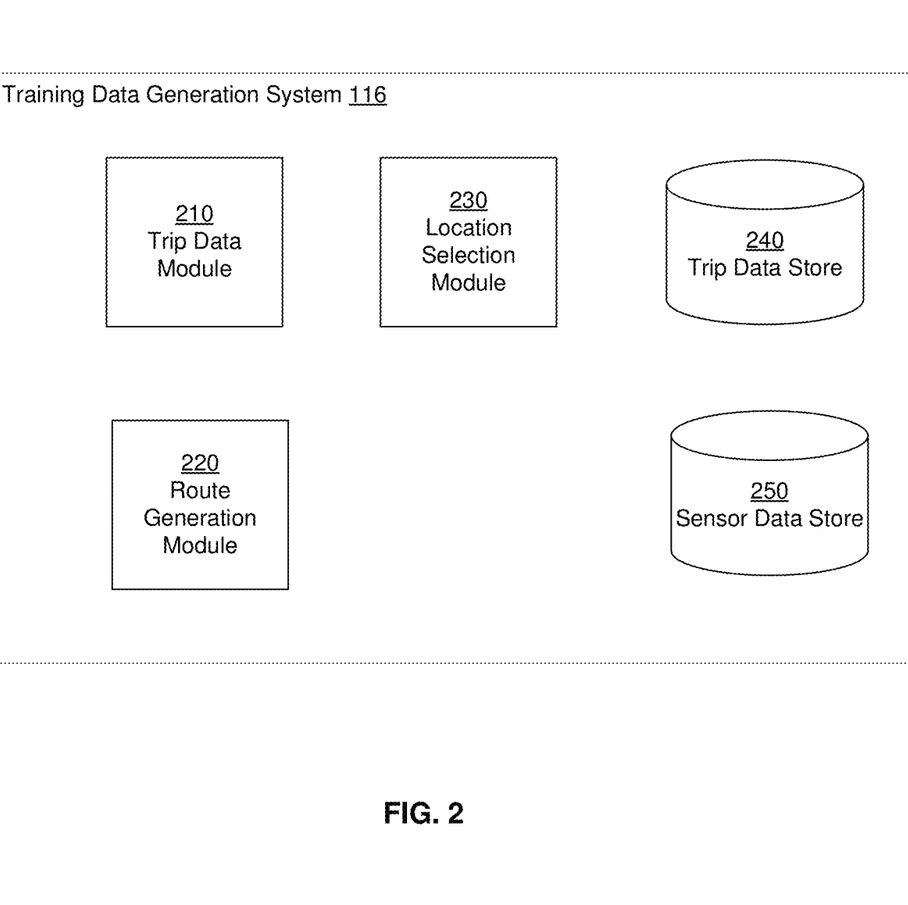
FIG. 2 is the architecture of a training data generation system according to an embodiment of the invention.

FIG. 2 is the architecture of a training data generation system according to an embodiment. The training data generation system 116 comprises a trip data module 210, a route generation module 220, a location selection module 230, a trip data store 240, and a sensor data store 240. Other embodiments may include more or fewer modules than those indicated in FIG. 2.

The trip data module 210 determines trip data describing trips that were either taken in the past by users or potential trips that may be taken by users in future using vehicles of a particular vehicle type, for example, bicycles, motorcycles, scooters, skateboards, or any micromobility vehicle (used for short distance transports). In an embodiment, the trip data module 210 stores the trip data in the trip data store 240. The information describing a trip may include an origin (also referred to as the source) of the trip and the destination (also referred to as the target) of the trip. A trip from an origin to a destination may be completed via multiple possible paths. Accordingly, the trip is independent of the path. The origin of a trip refers to the location where the trip starts and the destination of the trip refers to the location where the trip ends. In some embodiments, the trip represents historical data based on past trips taken by users (also referred to as the rider) and the trip data includes time when the trip was taken (for example, the start time and end time of the trip), the duration of the trip, information identifying the user, and so on. In an embodiment, the trip data module 210 accesses an external system that acts as a source of trip data. For example, a website or a webservice may provide data describing bicycle trips taken in a region. In another embodiment, the system receives information describing potential origins and destinations of trips, for example, an expert may identify origins and destinations of trips. Examples of origins and/or destinations of bicycle trips include schools, parks, bicycle rental places, and so on. In an embodiment, the system receives metadata describing characteristics or attributes of locations that are likely to be origin or destinations of trips and uses map data or a map service to identify instances of locations that satisfy the characteristics specified or locations that have the specified attributes. For example, given metadata information that parks are likely to be destinations of bicycle trips, the system accesses various parks from a map service. Alternatively, given metadata information that bicycle rental services are likely to be origins of trips, the system accesses a map service to retrieve various bicycle rental places and store them as origins of trips.

The route generation module 220 determines routes that are likely to be traversed by vehicles of a particular vehicle type based on trip data collected by the trip data module 210. In an embodiment, the route generation module 220 receives the origin and destination of a trip and determines the route between the origin and destination. The route generation module 220 may access a map service that provides routes between origins and destinations of trips. The route generation module 220 may access a database representation of a map to determine routes between an origin and destination. For example, the database storing maps may store a graph representation of maps that include nodes representing various locations and edges representing roads connecting the locations. The route generation module 220 may perform graph traversal of the graph representation of a map of a region from an origin to a destination to determine the route from the origin to the destination.

The sensor data store 250 stores sensor data captured in various locations, for example, locations determined to have high likelihood of finding vehicles of a particular vehicle type. The sensor data may include camera images, videos or video frames of traffic scenarios at these locations, LIDAR scans, infrared sensor data, and so on. The sensor data store 250 may also store metadata describing the sensor data, for example, location where the sensor was captured, time (or time of the day) when the sensor data was captured, vehicle attributes that were received from the vehicle when the sensor data was captured, for example, speed of the vehicle, angle of steering wheel, location of the vehicle and so on. The metadata describing the sensor data may include attributes that are determined by analyzing the sensor data, for example, by executing various types of machine learning based models using the video frame.

The location selection module 230 identifies various locations having a high likelihood of finding vehicles of a particular vehicle type. The location selection module 230 executes various processes described herein according to various embodiments to determine the locations. The location selection module 230 may recommend the locations having high likelihood of finding vehicles of a particular vehicle type to a user. The user may obtain sensor data from the recommended locations, for example, by sending vehicles to these locations for capturing sensor data. Alternatively, the system may access the sensor data store 250 and filter the sensor data by location to exclude locations that have below a threshold likelihood of finding vehicles of a particular vehicle type. Alternatively, the system may access the sensor data store 250 and filter the sensor data by location to select locations that have above a threshold likelihood of finding vehicles of a particular vehicle type.

Figure 3:
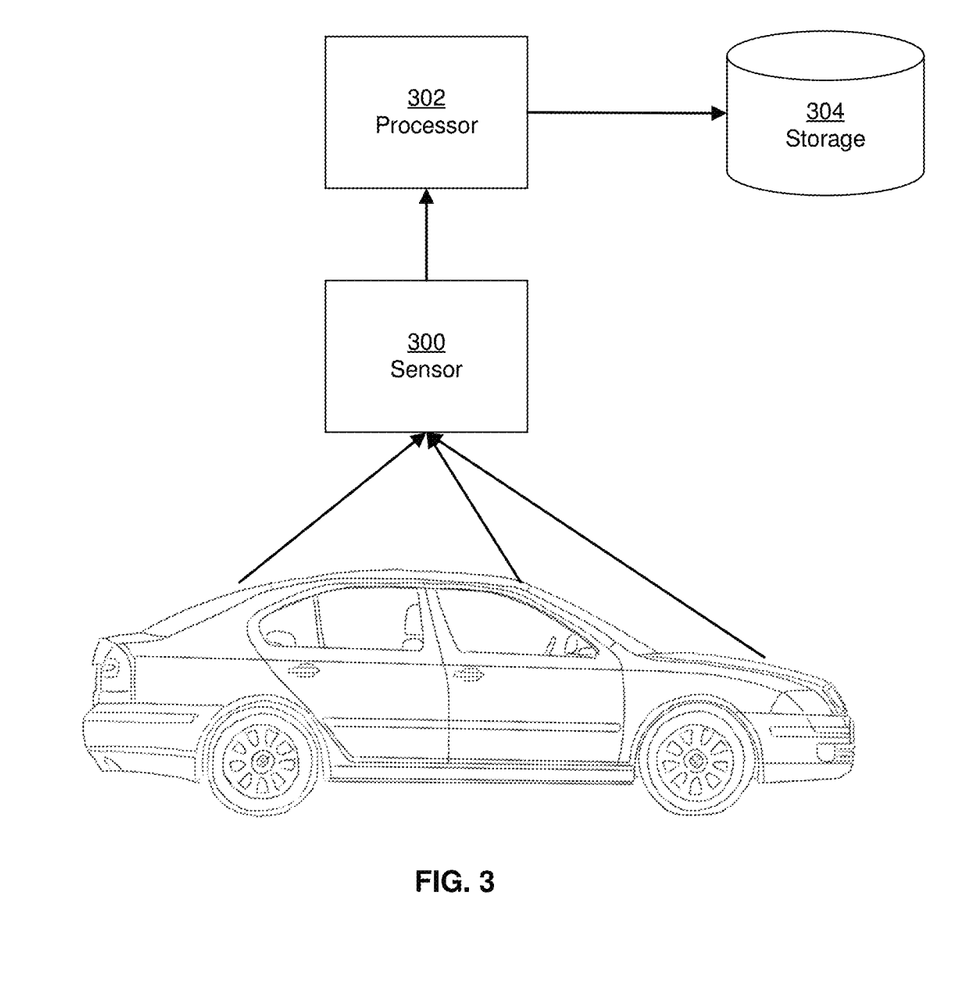
FIG. 3 is a system diagram showing a sensor system associated with a vehicle, according to some embodiments of the invention.

FIG. 3 is a system diagram showing a sensor system associated with a vehicle, according to some embodiments of the invention. FIG. 3 shows a vehicle 306 with arrows pointing to the locations of its sensors 300, a local processor and storage 302, and remote storage 304.

Data is collected from cameras or other sensors 300 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video frames.

In some embodiments, data in the remote storage 304 also includes database tables associated with the sensor data. When sensor data is received, a row can be added to a database table that records information about the sensor data that was recorded, including where it was recorded, by whom, on what date, how long the segment is, where the physical files can be found either on the internet or on local storage, what the resolution of the sensor data is, what type of sensor it was recorded on, the position of the sensor, and other characteristics.

Figure 4:
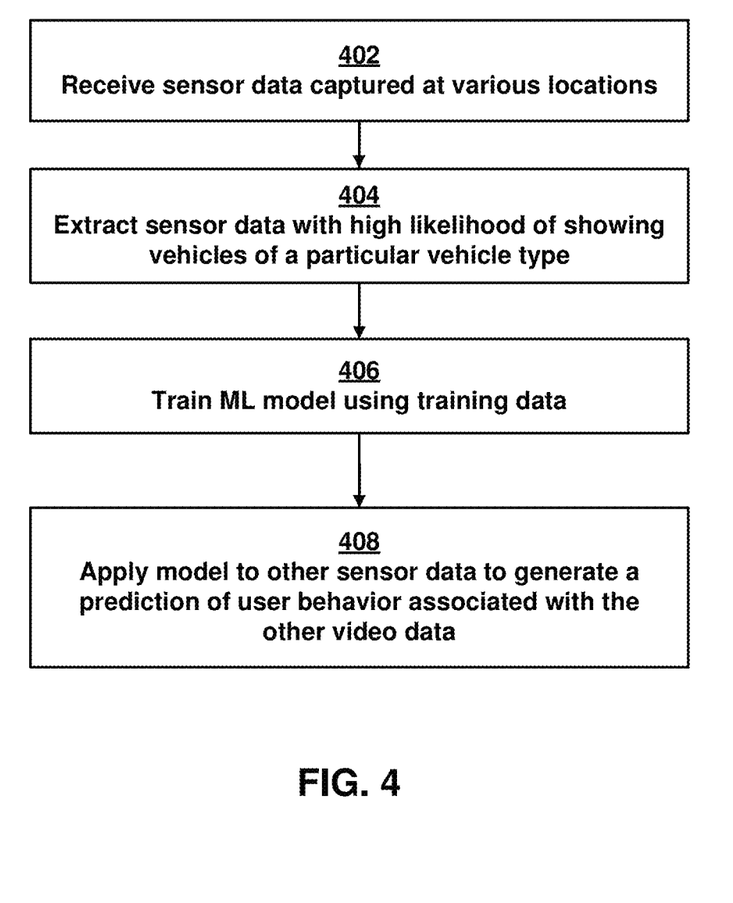
FIG. 4 is a flowchart showing a process of training and using a machine learning based model to predict information describing traffic entities, according to some embodiments of the invention.

FIG. 4 is a flowchart showing a process of training and using a machine learning based model to predict information describing traffic entities, according to some embodiments of the invention.

The system receives sensor data captured at various locations. In one implementation, the sensor data represents video or other data captured by a camera or sensor mounted on the vehicle 102. The camera or other sensor can be mounted in a fixed or temporary manner to the vehicle 102. The camera does not need to be mounted to an automobile, and could be mounted to another type of vehicle, such as a bicycle or a motorcycle. As the vehicle travels along various streets, the camera or sensor captures still and/or moving images (or other sensor data) of pedestrians, bicycles, automobiles, etc. moving or being stationary on or near the streets. The sensor data captured by the camera or other sensor may be transmitted from the vehicle 102, over the network 104, and to the server 106 where it is stored.

The system extracts 404 sensor data captured at locations determined to have high likelihood of finding vehicles of a particular vehicle type (e.g., bicycles) in traffic. In an embodiment, the system uses the process illustrated in FIG. 5 for extracting 404 sensor data captured at locations determined to have high likelihood of finding vehicles of a particular vehicle type in traffic.

The system trains the machine learning based model using the extracted 404 sensor data. In an embodiment, the sensor data may be labelled, for example, by users presented with the sensor data. The users viewing the sensor data may annotate the sensor data with information. For example, the users may annotate the sensor data with information describing the state of mind of a user identified in the sensor data such as a pedestrian or bicyclist. The system uses the annotations of the sensor data to label the data and use the labelled data to train the machine learning based model, for example, using a supervised learning technique. In an embodiment, the machine learning based model is configured to receive as input, sensor data and predict an output representing the state of mind of a user captured by the sensor data.

The prediction engine 114 uses the trained model from the model training system 112 to apply 408 the trained model to other sensor data to generate a prediction of user behavior associated with the other video data. The prediction engine 114 may predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimuli. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

The machine learning based model may be any type of supervised learning algorithm capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or non-linear kernels that are two dimensional or three dimensional.

In one embodiment of the model training system 112, the machine learning based model can be a deep neural network. In this embodiment the parameters are the weights attached to the connections between the artificial neurons comprising the network. Pixel data from an image in a training set collated with human observer summary statistics serves as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., back-propagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set. At the end of this process the model is "trained", which in some embodiments, means that the difference between the summary statistics output by the neural network and the summary statistics calculated from the responses of the human observers is minimized.

According to an embodiment, a vehicle computing system 120 executes the trained machine learning based model to predict hidden context representing intentions and future plans of a traffic entity (e.g., a pedestrian or a bicyclist). The hidden context may represent a state of mind of a person represented by the traffic entity. For example, the hidden context may represent a near term goal of the person represented by the traffic entity, for example, indicating that the person is likely to cross the street, or indicating that the person is likely to pick up an object (e.g., a wallet) dropped on the street but stay on that side of the street, or any other task that the person is likely to perform within a threshold time interval. The hidden context may represent a degree of awareness of the person about the autonomous vehicle, for example, whether a bicyclist driving in front of the autonomous vehicle is likely to be aware that the autonomous vehicle is behind the bicycle.

The hidden context may be used for navigating the autonomous vehicle, for example, by adjusting the path planning of the autonomous vehicle based on the hidden context. The vehicle computing system 120 may improve the path planning by taking a machine learning based model that predicts the hidden context representing a level of human uncertainty about the future actions of pedestrians and cyclists and uses that as an input into the autonomous vehicle's motion planner. The training dataset of the machine learning models includes information about the ground truth of the world obtained from one or more computer vision models. The vehicle computing system 120 may use the output of the prediction engine 114 to generate a probabilistic map of the risk of encountering an obstacle given different possible motion vectors at the next time step. Alternatively, the vehicle computing system 120 may use the output of the prediction engine 114 to determine a motion plan which incorporates the probabilistic uncertainty of the human assessment.

In an embodiment, the prediction engine 114 determines a metric representing a degree of uncertainty in human assessment of the near-term goal of a pedestrian or any user representing a traffic entity. The specific form of the representation of uncertainty is a model output that is in the form of a probability distribution, capturing the expected distributional characteristics of user responses of the hidden context of traffic entities responsive to the users being presented with videos/images representing traffic situations. The model output may comprise summary statistics of hidden context, i.e., the central tendency representing the mean likelihood that a person will act in a certain way and one or more parameters including the variance, kurtosis, skew, heteroskedasticity, and multimodality of the predicted human distribution. These summary statistics represent information about the level of human uncertainty.

In an embodiment, the vehicle computing system 120 represents the hidden context as a vector of values, each value representing a parameter, for example, a likelihood that a person represented by a traffic entity is going to cross the street in front of the autonomous vehicle, a degree of awareness of the presence of autonomous vehicle in the mind of a person represented by a traffic entity, and so on.

Process of Filtering Video Frames for a Traffic Scenario

Figure 5:
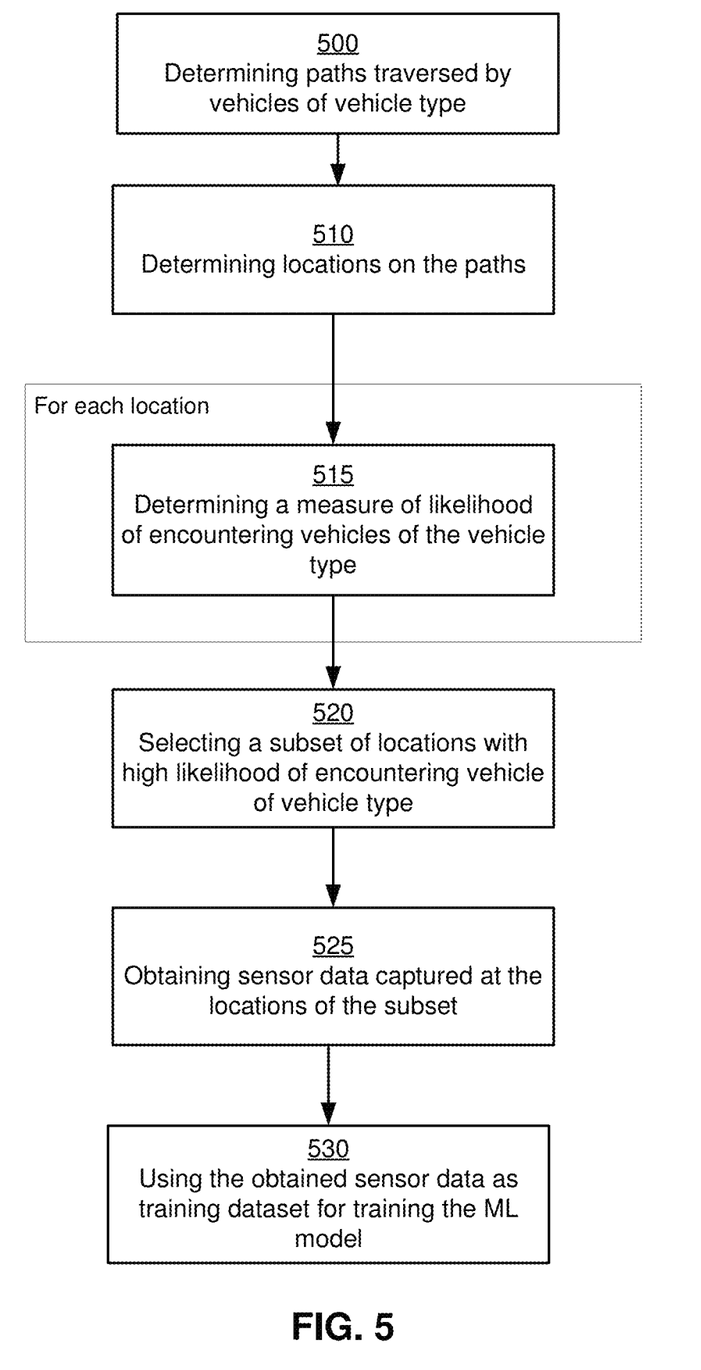
FIG. 5 represents a flowchart illustrating the process of generating training data based on sensor data representing traffic including vehicles of a particular vehicle type, according to an embodiment.

FIG. 5 represents a flowchart illustrating the process of generating training data based on sensor data representing traffic including vehicles of a particular vehicle type, according to an embodiment. The steps are described as being performed by a system, for example, the training data generation system 116. The steps may be performed by the various modules of the training data generation system 116, for example, the modules shown in FIG. 2.

The system determines 500 paths traversed by vehicles of a vehicle type, for example, bicycles. In an embodiment, the system receives information describing trips performed by users using vehicles of the vehicle type, for example, from an external data source such as a website providing trip information including origins and destinations of each trip. The system provides a pair of origin and destination of the trip to a mapping service that determines a route between the origin and destination. The route represents the path between the origin and destination. The system repeats the steps for each distinct pair of origin and destination corresponding to a trip to collect paths traversed by vehicles of the vehicle type.

The system determines 510 locations along the paths 500 determined by the system. In an embodiment, the system samples locations along the paths for example, based on a random selection. The system may select locations that are located at a uniform distance along the path. The locations include the origin and the destination of the path as well as one or more other locations along the path. In an embodiment, the system selects locations that represent turns along the path. A turn represents a location where the path changes direction by more than some threshold value. In an embodiment, the system further selects locations along the path that represent traffic intersections, whether or not the path indicates a turn at the location. This allows the system to select interesting locations even if the path indicates that the vehicle should continue straight along the path. An intersection represents a location where two or more roads intersect. The locations where there are turns along the path or there are intersections along the path represent locations that are likely to provide higher quality training data compared to other locations where the vehicle continues following the path.

For each location determined 510 by the system, the system determines 515 a measure of likelihood of encountering one or more vehicles of the vehicle type in traffic at the location. In an embodiment, the system determines 515 the measure of likelihood by aggregating paths that pass through the location. For example, for certain popular locations, more paths may pass through the location compared to other locations. As a result, these locations have a higher likelihood of capturing a vehicle of the vehicle type in sensor data captured at the location. In an embodiment, the measure of likelihood of encountering vehicles of the vehicle type in traffic at a location is determined as a score that is directly related to the number of paths that pass through the location. For example, the measure of likelihood of encountering vehicles of the vehicle type in traffic at a location is a score that is directly proportional to the number of paths that pass through the location. The system may determine the score by normalizing the number of trips at a location by a value, for example, an estimate of an average number of trips per location or an estimate of the maximum number of trips per location.

The system selects 520 a subset of locations from the plurality of locations based on the determined measure of likelihood of encountering vehicles of the vehicle type in traffic at the location. In an embodiment, the system ranks the locations based on the measure of likelihood of encountering vehicles of the vehicle type in traffic at the location and selects the top few locations. In an embodiment, the system selects the subset of locations as locations having more than a threshold value of the measure of likelihood of encountering vehicles of the vehicle type in traffic at the location.

The system obtains 525 sensor data captured at each location from the subset of locations, the sensor data representing traffic at the location. The system may recommend the selected locations to the system administrator for obtaining sensor data from these locations by dispatching vehicles or users to these locations to capture sensor data. Alternatively, if the system has previously captured sensor data from various locations, the system filters the sensor data to extract a subset of sensor data that was captured at these locations.

The system uses 530 the sensor data as training dataset for training a machine learning based model configured to receive input sensor data describing traffic and output a score used for navigation of autonomous vehicles. The trained machine learning based model may be used for navigation of an autonomous vehicle.

Figure 6:
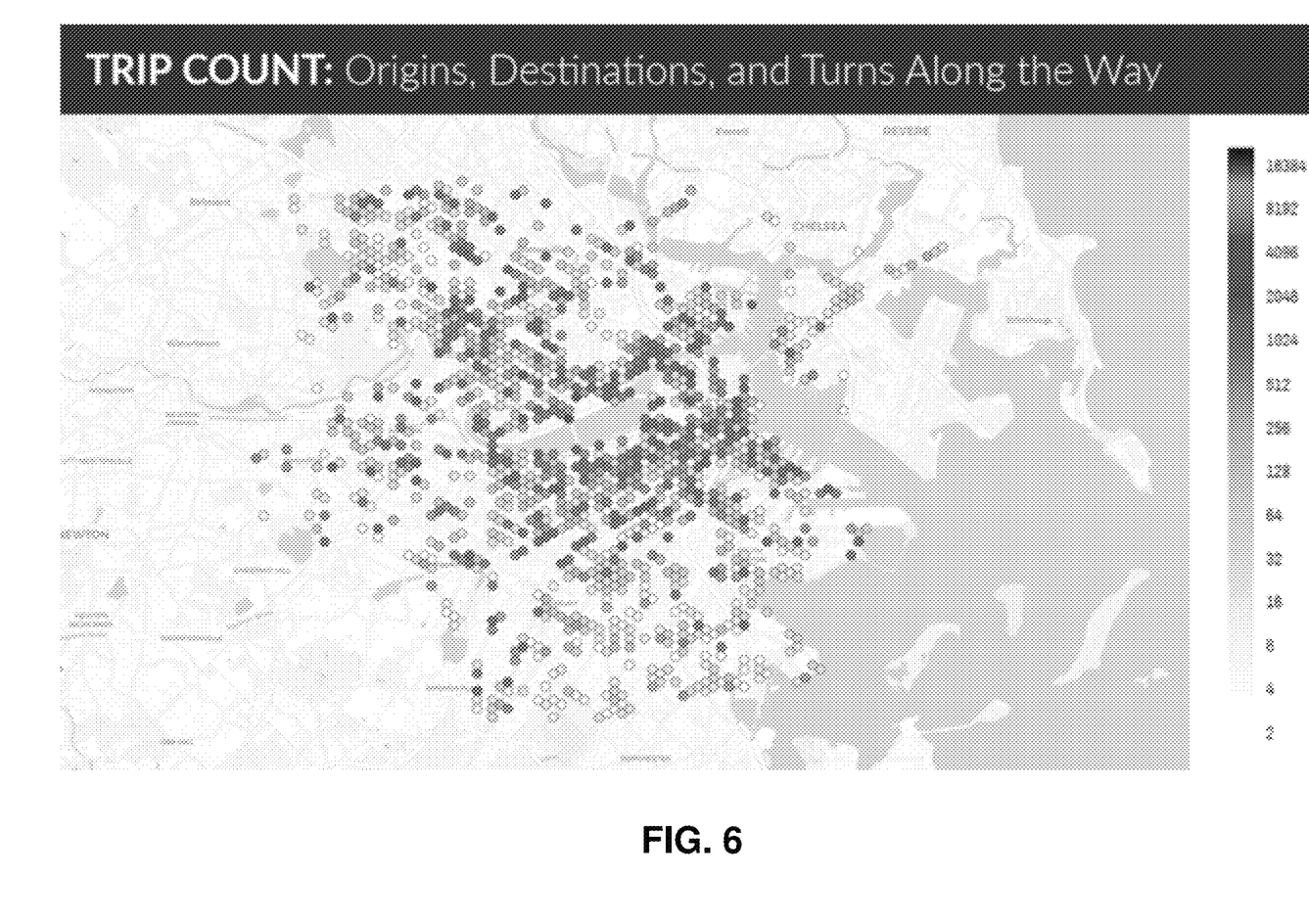
FIG. 6 is a heat map of a region showing the likelihood of encountering vehicles of a particular vehicle type, according to some embodiments of the invention.

FIG. 6 is a heat map of a region showing the likelihood of encountering vehicles of a particular vehicle type, according to some embodiments of the invention. The map shows locations in a region that are encountered during trips made using a particular type of vehicle, for example, a bicycle. The locations are color coded based on the number of trips associated with the location. Accordingly, each location is associated with a number of trips using vehicles of the vehicle type through the location that are expected to occur or an estimate of a number of trips through the location that are expected to occur. Accordingly, the system uses the heat map to determine a likelihood of encountering a vehicle of the vehicle type at each location. The system uses sensor data captured at locations having a high likelihood of encountering vehicles of the vehicle type for training machine learning based models for predicting attributes used for navigation of autonomous vehicles.

Navigating an Autonomous Vehicle Through Traffic

According to an embodiment, the system navigates the autonomous vehicle based on hidden context. The vehicle computing system 120 receives sensor data from sensors of the autonomous vehicle. For example, the vehicle computing system 120 may receive lidar scans from lidars and camera images from cameras mounted on the autonomous vehicle. If there are multiple cameras mounted on the vehicle, the vehicle computing system 120 receives videos or images captured by each of the cameras. In an embodiment, the vehicle computing system 120 builds a point cloud representation of the surroundings of the autonomous vehicle based on the sensor data. The point cloud representation includes coordinates of points surrounding the vehicle, for example, three dimensional points and parameters describing each point, for example, the color, intensity, and so on.

The vehicle computing system 120 identifies one or more traffic entities based on the sensor data, for example, pedestrians, bicyclists, or other vehicles driving in the traffic. The traffic entities represent non-stationary objects in the surroundings of the autonomous vehicle.

In an embodiment, the autonomous vehicle obtains a map of the region through which the autonomous vehicle is driving. The autonomous vehicle may obtain the map from a server. The map may include a point cloud representation of the region around the autonomous vehicle. The autonomous vehicle performs localization to determine the location of the autonomous vehicle in the map and accordingly determines the stationary objects in the point cloud surrounding the autonomous vehicle. The autonomous vehicle may superimpose representations of traffic entities on the point cloud representation generated.

The vehicle computing system 120 repeats the following steps and for each identified traffic entity. The vehicle computing system 120 provides the sensor data as input to the ML model and executes the ML model. The vehicle computing system 120 determines a hidden context associated with the traffic entity using the ML model, for example, the intent of a pedestrian.

The vehicle computing system 120 navigates the autonomous vehicle based on the hidden context. For example, the vehicle computing system 120 may determine a safe distance from the traffic entity that the autonomous vehicle should maintain based on the predicted intent of the traffic entity.

Computing Machine Architecture

Figure 7:
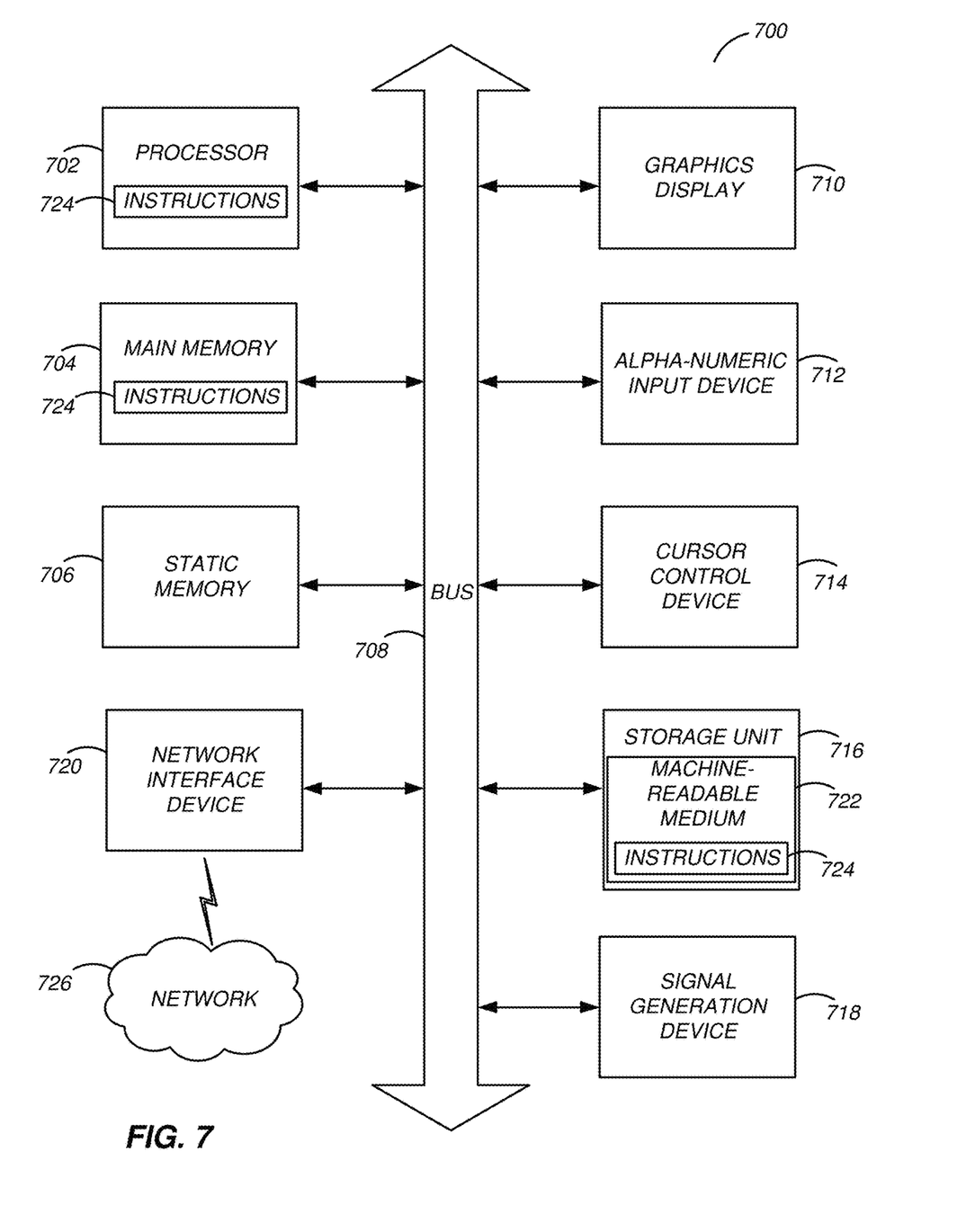
FIG. 7 is a block diagram illustrating components of an example machine able to read instructions from a machine-readable medium and execute them in a processor (or controller).

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Although embodiments disclosed describe techniques for navigating autonomous vehicles, the techniques disclosed are applicable to any mobile apparatus, for example, a robot, a delivery vehicle, a drone, and so on.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computer implemented method of generating training data for machine learning based models for autonomous vehicles, comprising:
receiving information describing a plurality of paths traversed by vehicles of a vehicle type, each of the plurality of paths from an origin to a destination;
determining a plurality of locations, wherein each location of the plurality of locations is on a path of the plurality of paths;
for each location of the plurality of locations, determining a measure of likelihood of encountering one or more vehicles of the vehicle type in traffic at the location;
selecting a subset of locations from the plurality of locations based on the determined measure of likelihood of encountering one or more vehicles of the vehicle type in traffic at the location;

obtaining sensor data captured at each location from the subset of locations, the sensor data representing traffic at the location;
using the sensor data as training dataset for training a machine learning based model configured to receive input sensor data describing traffic and output a score used for navigation of autonomous vehicles; and
using the machine learning based model for navigation of an autonomous vehicle.

2. The method of claim 1, wherein receiving information describing a plurality of paths comprises:
receiving, from a database of trips performed using vehicles of the vehicle type, information describing a plurality of trips, each trip identifying an origin of the trip and a destination of the trip; and
for each of the plurality of trips, accessing a map service to determine a path from the origin of the trip to the destination of the trip.

3. The method of claim 2, wherein the measure of likelihood of encountering a vehicle of the vehicle type in traffic at the location is determined based on the number of trips from the plurality of trips that follow a path that include the location.

4. The method of claim 1, wherein the measure of likelihood of encountering a vehicle of the vehicle type in traffic at the location is determined based on the number of paths from the plurality of paths that include the location.

5. The method of claim 1, wherein the vehicle type is one of: a bicycle, a motorcycle, a scooter, or a skateboard.

6. The method of claim 1, wherein using the machine learning based model for navigation of the autonomous vehicle comprises:
receiving sensor data captured by sensors of the autonomous vehicle;
providing the sensor data as input to the machine learning based model that outputs one or more values associated with attributes of a traffic entity represented in the sensor data;
determining a navigation action corresponding to the one or more values; and
providing signals to controls of the autonomous vehicle to perform the determined navigation action.

7. The method of claim 1, wherein determining a plurality of locations comprises:
selecting a path from the plurality of paths;
identifying one or more turns along the selected paths; and
determining the location of each turn of the selected path.

8. A non-transitory computer readable storage medium storing instructions that when executed by a computer processor, cause the computer processor to perform steps comprising:
receiving information describing a plurality of paths traversed by vehicles of a vehicle type, each of the plurality of paths from an origin to a destination;
determining a plurality of locations, wherein each location of the plurality of locations is on a path of the plurality of paths;
for each location of the plurality of locations, determining a measure of likelihood of encountering one or more vehicles of the vehicle type in traffic at the location;
selecting a subset of locations from the plurality of locations based on the determined measure of likelihood of encountering one or more vehicles of the vehicle type in traffic at the location;
obtaining sensor data captured at each location from the subset of locations, the sensor data representing traffic at the location;
using the sensor data as training dataset for training a machine learning based model configured to receive input sensor data describing traffic and output a score used for navigation of autonomous vehicles; and
using the machine learning based model for navigation of an autonomous vehicle.

9. The non-transitory computer readable storage medium of claim 8, wherein instructions for receiving information describing a plurality of paths causes the computer processor to perform steps comprising:
receiving, from a database of trips performed using vehicles of the vehicle type, information describing a plurality of trips, each trip identifying an origin of the trip and a destination of the trip; and
for each of the plurality of trips, accessing a map service to determine a path from the origin of the trip to the destination of the trip.

10. The non-transitory computer readable storage medium of claim 9, wherein the measure of likelihood of encountering a vehicle of the vehicle type in traffic at the location is determined based on the number of trips from the plurality of trips that follow a path that includes the location.

11. The non-transitory computer readable storage medium of claim 8, wherein the measure of likelihood of encountering a vehicle of the vehicle type in traffic at the location is determined based on the number of paths from the plurality of paths that includes the location.

12. The non-transitory computer readable storage medium of claim 8, wherein the vehicle type is one of: a bicycle, a motorcycle, a scooter, or a skateboard.

13. The non-transitory computer readable storage medium of claim 8, wherein instructions for using the machine learning based model for navigation of the autonomous vehicle cause the computer processor to perform steps comprising:
receiving sensor data captured by sensors of the autonomous vehicle;
providing the sensor data as input to the machine learning based model that outputs one or more values associated with attributes of a traffic entity represented in the sensor data;
determining a navigation action corresponding to the one or more values; and
providing signals to controls of the autonomous vehicle to perform the determined navigation action.

14. The non-transitory computer readable storage medium of claim 8, wherein instructions for determining a plurality of locations cause the computer processor to perform steps comprising:
selecting a path from the plurality of paths;
identifying one or more turns along the selected paths; and
determining the location of each turn of the selected path.

15. A computer system comprising:
a computer processor; and
a non-transitory computer readable storage medium storing instructions that when executed by the computer processor, cause the computer processor to perform steps comprising:
information describing a plurality of paths traversed by vehicles of a vehicle type, each of the plurality of paths from an origin to a destination;

determining a plurality of locations, wherein each location of the plurality of locations is on a path of the plurality of paths;

for each location of the plurality of locations, determining a measure of likelihood of encountering one or more vehicles of the vehicle type in traffic at the location;

selecting a subset of locations from the plurality of locations based on the determined measure of likelihood of encountering one or more vehicles of the vehicle type in traffic at the location;

obtaining sensor data captured at each location from the subset of locations, the sensor data representing traffic at the location;

using the sensor data as training dataset for training a machine learning based model configured to receive input sensor data describing traffic and output a score used for navigation of autonomous vehicles; and using the machine learning based model for navigation of an autonomous vehicle.

16. The computer system of claim 15, wherein instructions for receiving information describing a plurality of paths causes the computer processor to perform steps comprising:

receiving, from a database of trips performed using vehicles of the vehicle type, information describing a plurality of trips, each trip identifying an origin of the trip and a destination of the trip; and for each of the plurality of trips, accessing a map service to determine a path from the origin of the trip to the destination of the trip.

17. The computer system of claim 16, wherein the measure of likelihood of encountering a vehicle of the vehicle type in traffic at the location is determined based on the number of trips from the plurality of trips that follow a path that includes the location.

18. The computer system of claim 15, wherein the measure of likelihood of encountering a vehicle of the vehicle type in traffic at the location is determined based on the number of paths from the plurality of paths that includes the location.

19. The non-transitory computer readable storage medium of claim 8, wherein the vehicle type is one of: a bicycle, a motorcycle, a scooter, or a skateboard.

20. The computer system of claim 15, wherein instructions for determining a plurality of locations cause the computer processor to perform steps comprising:

selecting a path from the plurality of paths;

identifying one or more turns along the selected paths; and determining the location of each turn of the selected path.

* * * * *